United States Patent [19]
Curvino et al.

[11] 4,118,926
[45] Oct. 10, 1978

[54] AUTOMATIC STALL RECOVERY SYSTEM

[75] Inventors: Salvatore J. Curvino, Palm Beach Gardens; Albert E. Warner, Jupiter, both of Fla.

[73] Assignee: United Technologies Corporation, Hartford, Conn.

[21] Appl. No.: 773,099

[22] Filed: Feb. 28, 1977

[51] Int. Cl.$^2$ .............................................. F02C 7/22
[52] U.S. Cl. ................. 60/39.06; 60/39.14; 60/39.28 R; 60/223
[58] Field of Search ............... 60/39.28 R, 223, 39.14, 60/39.06

[56] References Cited

U.S. PATENT DOCUMENTS

| 3,002,349 | 10/1961 | Arnett et al. | 60/39.28 R |
| 3,017,749 | 1/1962 | Heppler et al. | 60/39.28 R |
| 3,540,214 | 11/1970 | Stirgwolt | 60/39.28 R |
| 3,587,230 | 6/1971 | Schmidt | 60/39.28 R |
| 3,765,176 | 10/1973 | Nelson | 60/223 |
| 3,852,958 | 12/1974 | Adams | 60/39.28 R |
| 3,867,717 | 2/1975 | Moehring | 60/39.28 R |
| 3,874,167 | 4/1975 | Katsume | 60/39.28 R |
| 3,878,678 | 4/1975 | Huellmantel | 60/39.28 R |
| 3,938,319 | 2/1976 | Thomson | 60/39.28 R |

*Primary Examiner*—Robert E. Garrett
*Attorney, Agent, or Firm*—Norman Friedland

[57] ABSTRACT

This invention relates to a stall detector for a gas turbine engine that has as its feature, means for restarting the engine upon engine shutdown. In this mode, the automatic restart switch normally provided in an engine ignition system is made responsive to compressor discharge pressure so that it becomes actuated upon reaching a predetermined value. Concomitantly, the fuel system is reconnected.

5 Claims, 1 Drawing Figure

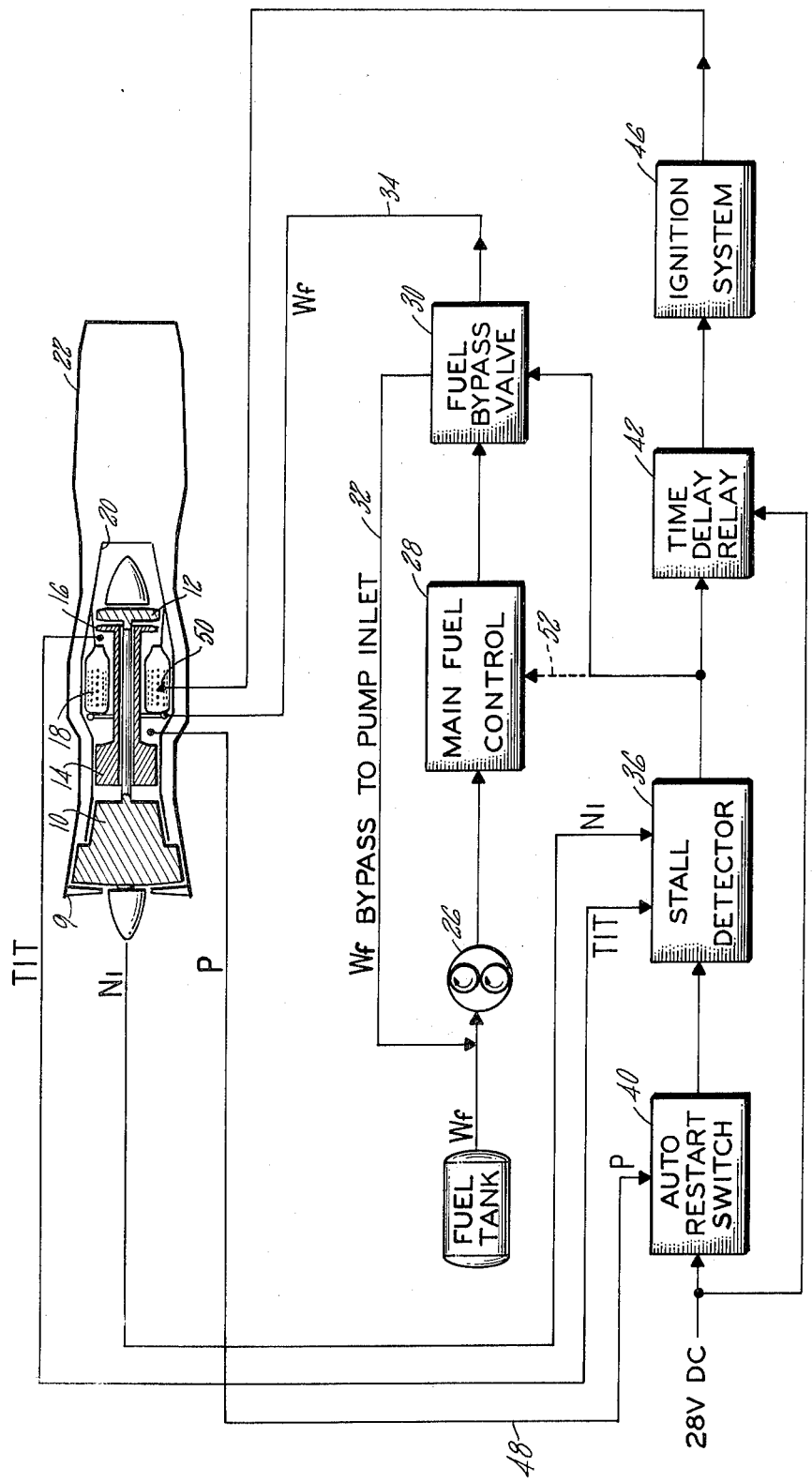

AUTOMATIC STALL RECOVERY SYSTEM

BACKGROUND OF THE INVENTION

This invention relates to gas turbine engines and particularly for an automatic stall recovery system thereof.

As is well known in the gas turbine industry, stall of axial flow compressor blades has long plagued the industry. Stall or surge is that phenomenon where flow separation adjacent the compressor blades is manifested causing a severe pressure reversal or pulsation. This pulsation, if allowed to persist not only impairs engine performance but can cause severe injury to the engine.

Although it is typical to provide in the fuel control optimum scheduling that attempts to operate the engine below the surge line, under adverse aircraft/engine transient operating conditions, this is sometimes not sufficient. Either the schedule is not accurate or errors either in the sensors or due to distorted signals for example so that as with a consequence this scheduling is not adequate. Hence, there has been attempts in the industry to detect surge, or rather, detect imminent surge, since the phenomenon of surge can occur so fast that it may be catastrophic. Also, because of engine peculiarities, surge controls for one engine model may not be satisfactory for another. As an example, the time response for one given engine may be satisfactory to stop or correct for the surge once detected but in another, it may be too slow.

This invention contemplates obviating the problems noted above by providing an automatic stall recovery system. When the turbine inlet temperature becomes disproportionately high compared to rotor speed then the fuel flow is automatically shutoff. At a predetermined compressor condition, namely, when the compressor discharge pressure reaches a predetermined value, the ignition system is actuated to commence restarting the engine.

SUMMARY OF THE INVENTION

An object of this invention is to provide for a gas turbine engine powered aircraft improved means for automatically providing normal engine operation following action required as a result of a surge or imminent surge.

A still further object of this invention is to provide an improved stall detection and engine automatic restart means. The restart means responds to compressor discharge pressure and surge detection responds to low rotor speed ($N_1$) and turbine inlet temperature (T.I.T.) of a twin spool gas turbine engine.

Other features and advantages will be apparent from the specification and claims and from the accompanying drawings which illustrate an embodiment of the invention.

BRIEF DESCRIPTION OF THE DRAWING

The sole FIGURE is in schematic illustration of the invention.

DESCRIPTION OF THE PREFERRED EMBODIMENT

This invention, although described in its preferred embodiment as being utilized on a twin-spool gas turbine engine, it is to be understood that its application has utility with other gas turbine engines. Essentially this invention teaches an automatic recovery system for an engine shutdown, as in aircraft flight condition, resulting from the detection of surge or imminent surge.

As can be seen from the sole FIGURE the engine is a twin spool gas turbine engine having an inlet 9, a low fan/compressor 10, driven by the low turbine 12, a high compressor 14, driven by the high turbine 16, burner 18 emitting hot gases driving the turbines, and exhaust section 20, the engine may or may not include afterburner 22. The details of the engine are omitted herefrom as they are not deemed part of the invention and for further details reference is hereby made to the TF-30 engine manufactured by the P&WA Group of United Technologies Corporation, the assignee herein. Suffice it to say that this invention has particular utility in gas turbine engines that are susceptible to surge, as is typical when an axial flow compressor is used.

As schematically illustrated, fuel from the fuel tank is pressurized by a suitable fuel pump 26 prior to being metered by the fuel control 28; a portion of fuel being returned by the bypass valve 30 to the pump inlet via line 32 while the requisite amount is delivered to the engine burners via line 34. As is typical in fuel control engine installations, excess fuel is always fed to the fuel control metering valve and a portion thereof is returned to the engine's pump so as to maintain a constant pressure drop across the metering valve in a well known manner. Fuel controls like the JFC-12, JFC-25 and JFC-60 manufactured by the Hamilton Standard Division of United Technologies Corporation are examples of fuel controls that incorporate this feature. This invention contemplates utilizing this already existing fuel flow control means to restart the engine upon engine shutdown as will be described hereinbelow, or a separate bypass valve can be employed as shown.

While the stall detector shown in block 36 may take any well known form as for example, the one disclosed in U.S. application Ser. No. 633,308 filed on Nov. 19, 1975 now U.S. Pat. No. 4,060,979 by F. L. Elsaesser and J. H. Hall and assigned to the same assignee, it should be understood that the invention is not limited to the type of surge detector utilized. Any mechanism that will detect surge as imminent surge can be utilized.

In its preferred embodiment stall detector 36 senses turbine inlet temperature and low compressor speed andproduces an output signal when both values or permutations thereof reach certain criteria. Hence, when turbine inlet temperature is disproportionately high relative to low compressor speed the stall detector will transmit a suitable signal to actuate fuel bypass valve 30 to disconnect fuel flow to the engine and shunt the fuel back to pump 26. Concomitantly, automatic restart switch 40 connected to the 28 voltage power source actuates time delay 42 and ignition system 46. When high compressor discharge pressure or other suitable parameter is sensed via line 48 by any suitable available pressure sensor, the automatic restart switch is deactivated, deenergizing stall detector 36 and hence allowing fuel bypass valve 30 to resume to its normal operating condition and permitting the fuel control to resume operations. Time delay relay 42 connected to the 28 volt power source via line 44, holds the ignition system 46, operational for a finite period of time following a recovery of stall. Hence spark igniter 50 will remain energized for the finite time period.

As shown by the dash line 52, in fuel controls that can be modified or designed to provide the bypass feature, preferably the fuel bypass valve would be incorporated in the fuel control and would be actuated similarly to the way the valve 30 is actuated.

The automatic restart switch, the time delay ignition system and igniter are all well known commercially available devices and a detailed description thereof is omitted herefrom for the sake of clarity and convenience.

It should be understood that the invention is not limited to the particular embodiments shown and described herein, but that various changes and modifications may be made without departing from the spirit or scope of this novel concept as defined by the following claims.

We claim:

1. In combination, a gas turbine engine having a compressor, a burner, fuel flow means including a fuel metering valve feeding fuel to said burner and a turbine driving said compressor, means responsive to engine operation parameters for sensing a stall condition for disconnecting the fuel flow from said fuel metering valve to said burner, a spark igniter in said burner for igniting said fuel, ignition means for actuating said spark igniter, a stall recovery system including an automatic restart switching means connected to said stall responsive means responsive to an engine operating parameter for deactivating said stall responsive means upon said parameter reaching a predetermined value and a time delay means interconnecting said stall responsive means and said ignition system for holding said spark igniter in the ignition condition for a finite time upon deactivation of said stall recovery means.

2. The combination as in claim 1 including bypass valve means interposed between said fuel metering valve and said engine for bypassing said engine upon being actuated by said stall responsive means, and being deactivated in response to said automatic restart switching means whereby said bypass connects said fuel metering valve to said engine.

3. The combination as in claim 1 wherein said operating parameter is compressor discharge pressure.

4. The combination as in claim 2 wherein said stall responsive means is responsive to a predetermined condition of compressor speed and turbine inlet temperature.

5. The method of automatically restarting a gas turbine engine after shutdown upon a stall condition, said engine having a compressor and burner and fuel flow means including a fuel metering valve feeding fuel to said burner and a turbine driving said compressor comprising the steps of:

sensing an engine operation parameter to detect a stall condition, activating the stall detectors upon said parameter reaching a predetermined condition in the step of sensing, disconnecting the fuel flow from said fuel metering valve to said burner by said stall detector, igniting a spark igniter in said burner, sensing a compressor discharge pressure, deactivating the stall detector and simultaneously connecting the fuel metering means to the engine and deactivating the spark igniter ignited in the step of igniting when the compressor discharge pressure obtained in the step of sensing reaches a predetermined value and, holding said spark igniter in the ignition condition for a finite period of time after the step of deactivating.

* * * * *